US012085469B2

(12) United States Patent
Knoll et al.

(10) Patent No.: US 12,085,469 B2
(45) Date of Patent: Sep. 10, 2024

(54) TORQUE SENSOR UNIT WITH PRESSED-IN SENSOR UNIT (71) Applicants: thyssenkrupp Presta AG, Eschen (LI); thyssenkrupp AG, Essen (DE)

(72) Inventors: Peter Knoll, Lindau (DE); Andreas Muenster, Weissensberg (DE); Peter Szabo, Grabs (CH)

(73) Assignees: THYSSENKRUPP PRESTA AG, Eschen (LI); thyssenkrupp AG, Essen (DE)

( * ) Notice: Subject to any disclaimer, the term of this patent is extended or adjusted under 35 U.S.C. 154(b) by 951 days.

(21) Appl. No.: 17/057,163

(22) PCT Filed: May 27, 2019

(86) PCT No.: PCT/EP2019/063594
§ 371 (c)(1),
(2) Date: Nov. 20, 2020

(87) PCT Pub. No.: WO2019/228952
PCT Pub. Date: Dec. 5, 2019

(65) Prior Publication Data
US 2021/0199520 A1 Jul. 1, 2021

(30) Foreign Application Priority Data
May 29, 2018 (DE) ...................... 10 2018 112 840.1

(51) Int. Cl.
G01L 3/10 (2006.01)
B62D 3/12 (2006.01)
(Continued)

(52) U.S. Cl.
CPC ................ G01L 3/104 (2013.01); B62D 3/12 (2013.01); B62D 5/04 (2013.01); G01L 5/221 (2013.01)

(58) Field of Classification Search
CPC ........... G01L 3/104; G01L 5/221; B62D 3/12; B62D 5/04
See application file for complete search history.

(56) References Cited

U.S. PATENT DOCUMENTS 7,509,883 B2 * 3/2009 Murakami .............. G01L 3/104
73/862.331
7,950,494 B2 * 5/2011 Ishihara ................... B62D 6/10
73/862.331
(Continued)

FOREIGN PATENT DOCUMENTS

CN 104949781 A 9/2015
CN 105339770 A 2/2016
(Continued)

OTHER PUBLICATIONS

English Translation of International Search Report issued in PCT/EP2019/063594, dated Aug. 22, 2019.

Primary Examiner — Kevin Hurley
Assistant Examiner — Michael R Stabley
(74) Attorney, Agent, or Firm — thyssenkrupp North America, LLC (57) ABSTRACT A torque sensor unit may include a ring magnet that can be connected to a first partial shaft for conjoint rotation, a magnetic flux conductor that can be connected to a second partial shaft, a sensor unit having a first housing, wherein the sensor unit detects a change in rotational angle between the partial shafts, a second housing that surrounds the ring magnet and the magnetic flux conductor and is fixedly connected to the first housing of the sensor unit. The second housing of the torque sensor unit may have a housing opening into which the first housing of the sensor unit is pressed to form a frictional connection.

20 Claims, 5 Drawing Sheets (51) Int. Cl.
*B62D 5/04* (2006.01)
*G01L 5/22* (2006.01)

(56) References Cited

U.S. PATENT DOCUMENTS

| | | | |
|---|---|---|---|
| 8,020,454 B2 * | 9/2011 | Ishihara | G01L 3/104 |
| | | | 73/862.331 |
| 9,341,528 B2 * | 5/2016 | Yukimura | G01L 3/104 |
| 2002/0189371 A1 * | 12/2002 | Nakane | B62D 6/10 |
| | | | 73/862.333 |
| 2003/0167857 A1 | 9/2003 | Sugimura | |
| 2005/0223820 A1 | 10/2005 | Murakami et al. | |
| 2008/0295612 A1 | 12/2008 | Rachui | |
| 2015/0276519 A1 | 10/2015 | Hama et al. | |
| 2016/0054187 A1 | 2/2016 | Schoepe et al. | |
| 2018/0015944 A1 | 1/2018 | Knoll et al. | |
| 2018/0319440 A1 | 11/2018 | Ernstson | |
| 2020/0011709 A1 | 1/2020 | Rauch | |

FOREIGN PATENT DOCUMENTS

| | | |
|---|---|---|
| CN | 107406095 A | 11/2017 |
| DE | 10 2004 055 124 A | 5/2006 |
| DE | 10 2007 043 502 A | 4/2009 |
| DE | 10 2016 104 275 A | 9/2017 |
| DE | 10 2017 116 454 A | 1/2019 |
| EP | 1 584 908 A2 | 10/2005 |
| EP | 1 783 034 A | 5/2007 |
| JP | 2008-295179 A | 12/2008 |

* cited by examiner

TORQUE SENSOR UNIT WITH PRESSED-IN SENSOR UNIT

CROSS REFERENCE TO RELATED APPLICATIONS

This application is a U.S. National Stage Entry of International Patent Application Serial Number PCT/EP2019/063594, filed May 27, 2019, which claims priority to German Patent Application No. DE 10 2018 112 840.1, filed May 29, 2018, the entire contents of both of which are incorporated herein by reference.

FIELD

The present disclosure generally relates to torque sensor units, electromechanical power steering systems, and methods for assembling torque sensor units for electromechanical power steering systems.

BACKGROUND

Torque sensors conventionally have a rotational angle sensor. Here, two shaft parts that can be rotated relative to another to a limited extent are elastically coupled to each other via a torsion spring. When one shaft part is rotated relative to the other shaft part by a torque applied by the driver of the vehicle, the relative rotational angle is substantially proportional to the torque introduced. For an accurate determination of the torque, it is important to be able to measure the rotational angle precisely.

Such a torque sensor is known, for example from the laid-open specification DE 10 2007 043 502 A1. A ring magnet is arranged on the upper steering shaft, while a holder having a magnetic stator is attached to the lower steering shaft, being located opposite to the permanent magnet in the radial direction over a small air gap. Via the stator, which usually consists of two separate stator parts, the magnetic flux of the magnet is conducted to a first and a second flux conductor, which then discharge the magnetic flux to a magnetic sensor, for example a Hall sensor.

Laid-open specification DE 10 2004 055 124 A1 discloses a torque sensor wherein the sensor is connected to the holder via a screw connection. This solution proves to be disadvantageous inasmuch as a large number of individual parts are needed as a result of the screw fixing of the components. Furthermore, the production method is complicated, since screws need machining operations, such as thread cutting, and the tightening of the screws.

Thus a need exists for a torque sensor that is simpler to manufacture. In addition, a need exists to devise a particularly simple method for producing a torque sensor.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to the above is a torque sensor unit comprising:
a ring magnet which can be connected to a first partial shaft for conjoint rotation and a magnetic flux conductor which can be connected to a second partial shaft,
a sensor unit having a first housing, which sensor unit detects a change in rotational angle between the partial shafts,
a second housing, which surrounds the ring magnet and the magnetic flux conductor and is fixedly connected to the first housing of the sensor unit, wherein the second housing of the torque sensor unit has a housing opening into which the first housing of the sensor unit is pressed to form a frictional connection.

The torque sensor is thus fixedly connected to the sensor unit without a screw connection, which considerably simplifies the production process.

Particularly preferably, as a result of pressing the first housing and therefore the sensor unit into the second housing, a connection which is formed exclusively by frictional forces is provided.

Furthermore, it is conceivable and possible that an additional integral connection is provided by using an adhesive or a cement for sealing.

Preferably, the sensor unit comprises a magnetic flux conductor and a magnetic sensor arranged on a printed circuit board. Preferably, the magnetic flux conductors are aligned relative to each other such that the magnetic field sensor is arranged centrally relative to the ring magnet.

It is preferred for the housing opening to have a first profile on at least two side faces, wherein the at least two side faces are advantageously located opposite each other and extend parallel to the longitudinal axis of the partial shafts. It is preferred for the first housing of the sensor unit to have a second profile arranged on outer faces corresponding to the at least two side faces of the housing opening. Preferably, the first and second profile are corrugated or formed as toothing. One profile preferably extends parallel to the longitudinal axis of the steering shaft. The grooves are oriented approximately perpendicular to the longitudinal axis as transverse fluting. As a mating piece, on the other profile which is to be brought into engagement therewith, a corrugated profile is likewise provided, but the grooves of which extend in the longitudinal direction parallel to the longitudinal axis as longitudinal fluting. It is further conceivable and possible for the first and second profile to be formed as parallel transverse toothing. The first profile can be arranged at an angle of 45°, based on the longitudinal axis, while the other toothing is arranged at an angle of 135°, based on the longitudinal axis. Furthermore, it is conceivable and possible for variable toothing to be provided as the first and second profile, therefore which has a variable toothing geometry along the profile. Likewise, the profiles can be formed as knurling.

In a preferred embodiment, the first and second profile are rotated preferably by an angle of about 90° relative to each other. Preferably, the profiles have grooves arranged in parallel.

Furthermore, it is conceivable and possible for a secondary safeguard to be provided, which prevents the sensor unit from migrating out in the opposite joining direction.

During the joining operation, the profiles are pushed onto each other to form the frictional connection. It is advantageous if the material into which one of the two profiles has been introduced has a higher ductility than the material into which the other of the two profiles has been introduced. It is conceivable and possible to arrange an elastic damper between the profiles, in order to prevent wear and to minimize noise during operation. In order to seal the profiles, adhesive, a coating or cement can be applied between the profiles.

In one embodiment, the first housing of the sensor unit has a T-shaped region with a neck and a crosspiece arranged perpendicular thereto. The perpendicular or transversely located crosspiece is preferably plate-like. It is preferred for the crosspiece to be in contact with an outer side of the second housing of the torque sensor unit when pressed in and to delimit the pressing-in depth. The neck of the first housing of the sensor unit preferably widens towards the crosspiece, the second profile being applied to the at least two side faces of the housing opening in the widened region. Preferably, when they are pressed in, the profiles interengage to form the frictional connection.

Furthermore, an electromechanical steering system for a motor vehicle is provided, having a steering pinion which is connected to a first partial shaft and which meshes with a rack for steering wheels, wherein the rack is mounted in a third housing and can be displaced along a longitudinal axis, at least one electric motor for steering force assistance, a torque sensor unit described previously, which is arranged between a second partial shaft connected to the steering wheel and the first partial shaft and detects a torque introduced into the steering wheel by the driver.

Furthermore, a method for assembling a torque sensor unit for an electromechanical power steering system is provided, comprising:
  a ring magnet connected to a first partial shaft for conjoint rotation and a magnetic flux conductor connected to a second partial shaft, wherein the two axially opposite partial shafts are connected to each other via a torsion bar (32),
  a physically fixed sensor unit having a first housing, wherein the sensor unit detects a change in rotational angle between the partial shafts,
  a second housing, which surrounds the ring magnet and the magnetic flux conductor, wherein the following steps are provided:
  positioning the sensor unit in a housing opening of the second housing of the torque sensor unit,
  pressing the sensor unit into the housing opening to form a frictional connection.

This type of connection can be produced very simply and automatically.

Preferably, the positioning comprises the following steps:
  introducing the sensor unit into the housing opening,
  lowering the sensor unit into the housing opening until the sensor unit lies against the housing opening and reaches into the magnetic flux conductor,
  moving the sensor unit in the housing opening between two limits formed by the magnetic flux conductor to determine a central position,
  moving the sensor unit in the housing opening to the central position.

The positioning and pressing-in are preferably performed by a robot having a gripper arm, which grips the sensor unit and then carries out the appropriate method steps. The robot is preferably designed to be sensitive. The gripper arm preferably grips the sensor unit with a maximum permissible force and presses the same into the housing opening with a predefined force. The central position along the longitudinal axis between the magnetic flux conductor is assumed by detecting the limiting positions and calculating a predefined distance.

Preferably, the sensor unit comprises a magnetic flux conductor and a magnetic sensor arranged on a printed circuit board.

It is preferred for the housing opening to have a first profile on at least two side faces, wherein the at least two side faces are advantageously located opposite each other and extend parallel to the longitudinal axis of the partial shafts. It is preferred for the first housing of the sensor unit to have a second profile arranged on outer faces corresponding to the at least two side faces of the housing opening.

In a preferred embodiment, the first and second profile are preferably rotated by an angle of about 90° relative to each other. The profiles preferably have grooves arranged in parallel.

During the joining operation, the profiles are pushed onto each other to form the frictional connection. It is advantageous if the material into which one of the two profiles has been introduced has a higher ductility than the material into which the other of the two profiles has been introduced.

In one embodiment, the first housing of the sensor unit has a T-shaped region with a neck and a crosspiece arranged perpendicular thereto. It is preferred for the crosspiece to be in contact with an outer side of the second housing of the torque sensor unit when pressed in and to delimit the pressing-in depth. The neck of the first housing of the sensor unit preferably widens towards the crosspiece, the first profile being applied to the at least two side faces of the housing opening in the widened region.

The torque sensor assembly is preferably attached to a steering shaft in a motor vehicle and fixed to two axially opposite partial shafts of the steering shaft and detects a change in rotational angle between the partial shafts.

Figure 1:
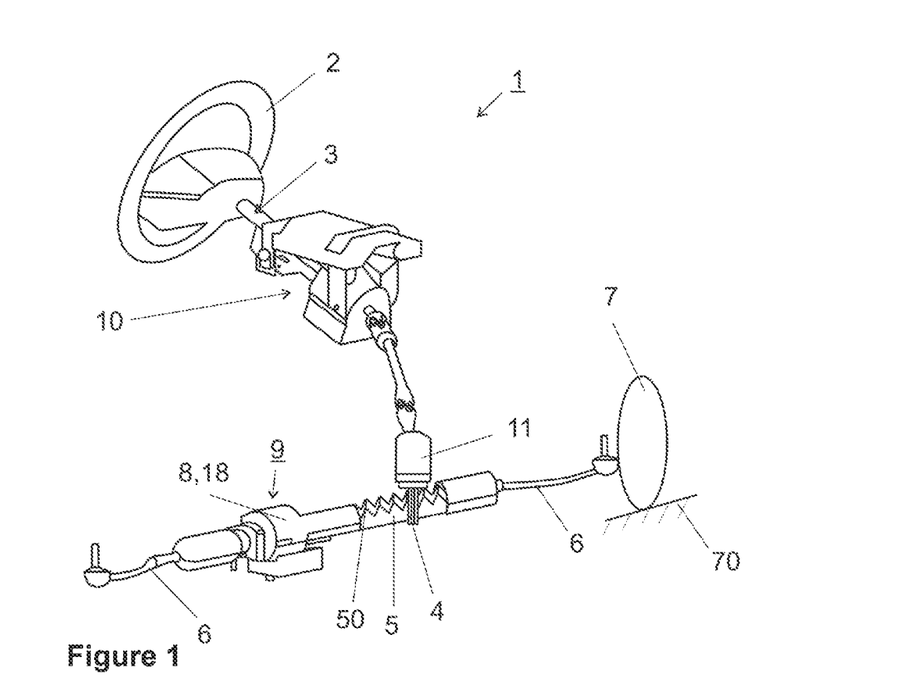
FIG. 1 is a schematic view of an example electromechanical power steering system.

FIG. 1 illustrates, schematically, an electromechanical motor-vehicle servo steering system 1 having a steering wheel 2, which is coupled to a steering shaft 3 for conjoint rotation. Via the steering wheel 2, the driver introduces an appropriate torque into the steering shaft 3 as a steering command. The torque is then transmitted via the steering shaft 3 to a steering pinion 4. The pinion 4 meshes in a known way with a toothed segment 50 of a rack 5. The steering pinion 4, together with the rack 5, forms a steering gear mechanism. The rack 5 is mounted in a third steering housing such that it can be displaced in the direction of its longitudinal axis. At its free end, the rack 5 is connected to track rods 6 via ball joints, not illustrated. The track rods 6 themselves are each connected to a steered wheel 7 of the motor vehicle in a known way via stub axles. A rotation of the steering wheel 2 leads via the connection of the steering shaft 3 and the pinion 4 to a longitudinal displacement of the rack 5 and therefore to pivoting of the steered wheels 7. The steered wheels 7 experience a reaction over a roadway 70, which acts counter to the steering movement. Consequently, in order to pivot the wheels 7, a force is necessary, which necessitates a corresponding torque on the steering wheel 2. An electric motor 8, 18 having a rotor position sensor (RPS) of a servo unit 9 is provided in order to assist the driver during this steering movement. The servo unit 9 can be coupled, as a power assistance device 9, 10, 11, either to a steering shaft 3, to the steering pinion 4 or to the rack 5. The respective power steering assistance system 9, 10, 11 introduces a power steering torque into the steering shaft 3, into the steering pinion 4 and/or into the rack 5, which assists the driver during the steering work. The three different power assistance systems 9, 10, 11 shown in FIG. 1 show alternative positions for their arrangement. Usually, only a single one of the positions shown is occupied by a power assistance system. The servo unit can be arranged as a superimposed steering system on the steering column or as a power assistance device on the pinion 4 or the rack 5.

Figure 2:
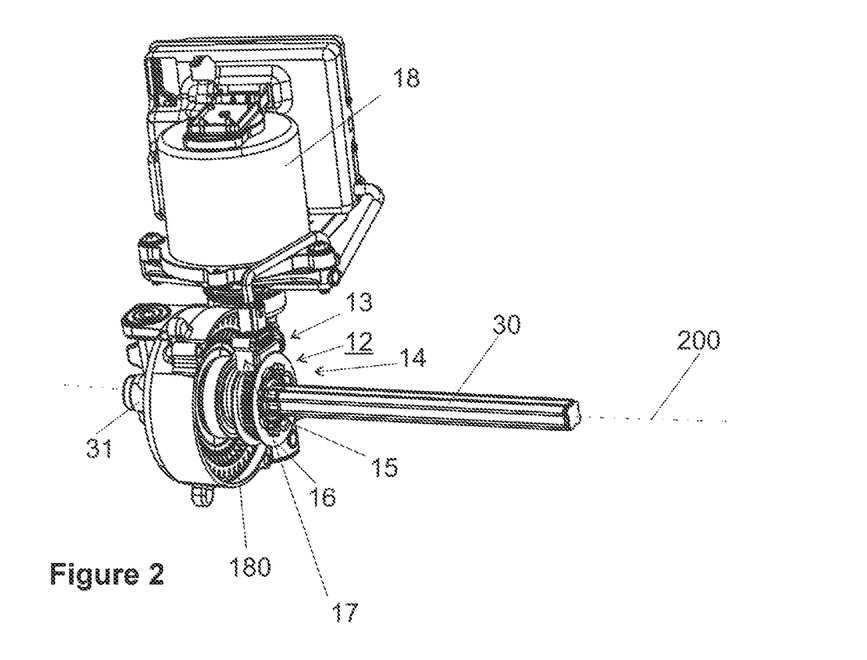
FIG. 2 is a perspective view of an electromechanical power steering system having an electric motor, a torque sensor, and a steering angle sensor.

FIG. 2 shows a torque sensor unit 12 which is part of an integral module 13 that comprises a steering angle sensor unit 14. The torque sensor unit 12 detects the rotation of the upper steering shaft 30 relative to the lower steering shaft 31 as a measure of the torque exerted manually on the upper steering shaft 30. The steering shaft sensor unit 14, on the other hand, measures the current steering angle of the lower steering shaft 31.

Figure 4:
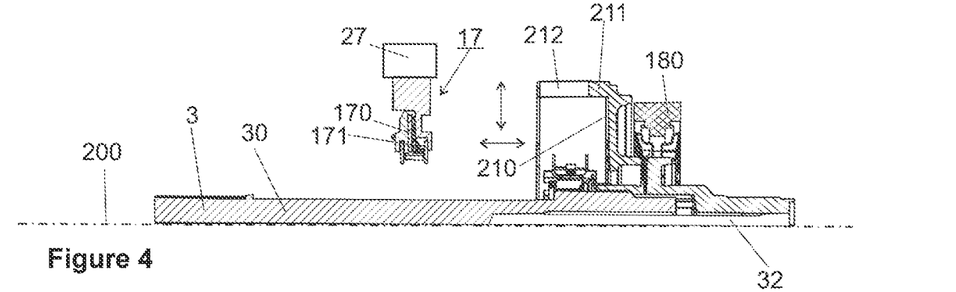
FIG. 4 is a longitudinal sectional view of a torque sensor in a first assembly step.

The upper steering shaft 30 and the lower steering shaft 31 are rotationally elastically coupled to each other via a torsion bar 32, shown in FIG. 4. The rotation between the upper steering shaft 30 and the lower steering shaft 31 can be determined via a rotational angle sensor. Said rotational angle sensor is also designated as torque sensor. The torque sensor unit 12 has a ring magnet (permanent magnet) 15 connected to the upper steering shaft 30 for conjoint rotation and a magnetic flux detector 16. An associated sensor unit 17 is physically fixedly connected to the unit of the electric motor 18. Depending on the torque measured by the torque sensor unit 12, the servo unit 9 provides steering assistance for the driver.

FIG. 2 further illustrates the fact that the electric motor or a servo motor 18 is coupled to a worm shaft, not illustrated, via a motor shaft. The worm of the worm shaft meshes the with a worm gear 180, that is connected to a pinion or, as illustrated here, to the lower steering shaft 31 for conjoint rotation. When the electric motor 18 is operated, the worm shaft is driven and the worm gear 180 rotates in a corresponding way in order to provide rotational support for the lower steering shaft 31.

Figure 3:
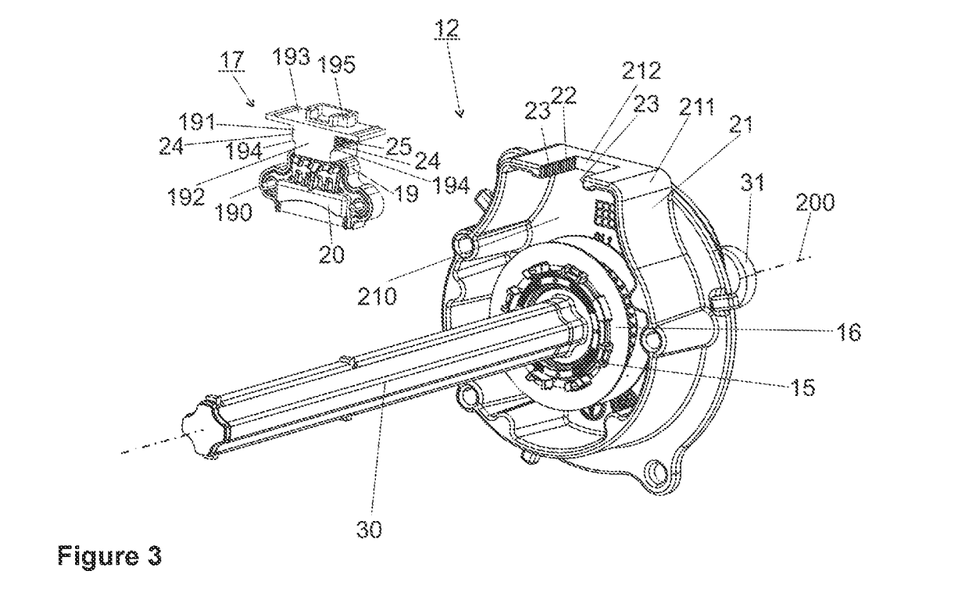
FIG. 3 is an exploded view of a torque sensor.

FIG. 3 illustrates an individual torque sensor unit 12 with magnetic sensor in detail. The sensor unit 17 has a first housing 19 and a magnetic flux conductor 20 arranged therein, and a magnetic sensor 171 arranged on a printed circuit board 170, as illustrated in FIG. 4. The flux conductors 16, 20 are used to concentrate the magnetic flux on the magnetic sensor. The magnetic sensor 171 detects the rotation of the upper steering shaft 30 connected to the magnetic ring 15 relative to the lower steering shaft 31 connected to the magnetic flux conductor 16. The first housing 19 of the sensor unit 17 has a first region 190, in which the flux conductor 20, the printed circuit board 170 and the magnetic sensor 171 are accommodated. In the assembled state, said first region 190 of the first housing 19 is closed by a housing cover, not illustrated. In a second region 191, which adjoins the first region 190, the first housing 19 is configured in a T shape. To form the T shape, the first housing 19 has a neck 192 which, in the assembled state of the sensor, extends in the radial direction of the longitudinal axis 200 of the steering shaft 3 and is adjoined by a transverse crosspiece 193. The neck 192 widens in the direction of the crosspiece 193, perpendicular to the longitudinal axis 200. For this purpose, the neck 192 has a ledge 194 on both sides. The transverse crosspiece 193 is plate-shaped. On its upper side, facing away from the neck, it has a projection 195 in the form of an edge, which surrounds contact elements, not illustrated, arranged on the crosspiece 193. The projection 195 forms a connector element, into which a plug is inserted in the assembled state of the sensor, in order to connect the sensor to a data line and to a power supply.

During the assembly by means of a robot, the first housing 19 of the sensor unit 17 is inserted into a second housing 21 of the torque sensor unit 12. In the assembled state, the second housing 21 of the torque sensor unit surrounds the ring magnet 15, the flux conductor 16 and the sensor unit 17. The second housing 21 of the torque sensor unit has a base surface 210 functioning as a base, which is surrounded peripherally by an edge 211. The second housing 21 is covered by a housing cover, not illustrated. The second housing 21 has a housing opening 212 in the edge 211, which is open on one side and into which the sensor unit 17 is inserted. To position the sensor unit 17 in the housing opening 212, the housing opening has a corrugated profile 22 in the form of grooves arranged in parallel (fluting) on the side faces 23 which extend parallel to the longitudinal axis 200 of the steering shaft. The grooves are oriented approximately perpendicular to the longitudinal axis 200 (transverse fluting). As a mating piece, on the sides 24 of the housing neck 192 of the sensor unit 17 which are to be brought into engagement therewith, a corrugated profile 25 is likewise provided above the ledges 194, but the grooves of which extend in the longitudinal direction parallel to the longitudinal axis (longitudinal fluting). The two profiles 22, 25 are thus preferably arranged rotated by an angle of about 90° relative to each other. During the assembly of the sensor unit 17 in the second housing 21 of the torque sensor, the sensor unit 17 is pressed into the housing opening 212. Preferably, the material of one side pair 23, 24 to be provided with a profile has a higher ductility than the material of the other side pair 23, 24. During the pressing action, the fluting of the side pair which is made of a material with higher ductility is pressed with a frictional fit into the overlapping fluting of the other side pair. In the assembled state, the underside of the crosspiece 193 of the first housing 19 of the sensor unit 17 rests on the outer side of the edge 211 of the second housing 21 of the torque sensor. The neck 192 of the first housing 19 of the sensor unit 17 penetrates the housing opening 212 in the process.

The sensor unit 17 is aligned with a pressing axis by a sensitive robot 27 and positioned in the second housing 21 of the torque sensor.

In FIGS. 4 to 9, the assembly method is illustrated. In a first assembly step (FIG. 4), the sensor unit 17 is aligned at a predefined distance from the steering shaft 3 and introduced along the longitudinal axis 200 into the housing opening 212 of the second housing 21 of the torque sensor. The arrows indicate the direction of movement. The neck 192 of the sensor unit 17 penetrates the housing opening 212 below the ledge 194. The neck 192 below the ledge 194 is smaller in diameter than the housing opening 212, so that the sensor unit 17 does not make contact with the second housing 21 of the torque sensor in this first step.

Figure 5:
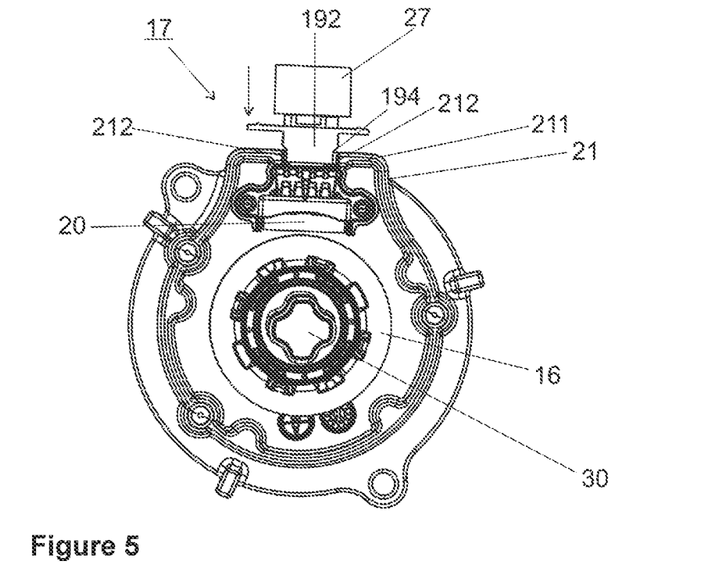
FIG. 5 is a front view of a torque sensor with a magnetic sensor positioned.

As illustrated in FIG. 5, in a second assembly step the sensor unit 17 is pressed with a predefined force onto the second housing 21 of the torque sensor, so that the sensor unit 17 at the neck 192 in the region of the ledge 194 comes into contact with the edge 211 of the second housing 21 of the torque sensor 12. The first housing 19 of the sensor unit 17 is configured such that the magnetic flux conductor 20 of the sensor unit 17 engages between the magnetic flux sensor 16 connected to the lower steering shaft 31. The magnetic flux sensor 20 of the sensor unit 17 is configured in the shape of an H in profile along the longitudinal axis 200; the two transverse elements engage between the rings of the magnetic flux conductor 16, which is configured in the shape of a U in profile along the longitudinal axis. This state is illustrated, for example, in FIG. 6.

Figure 6:
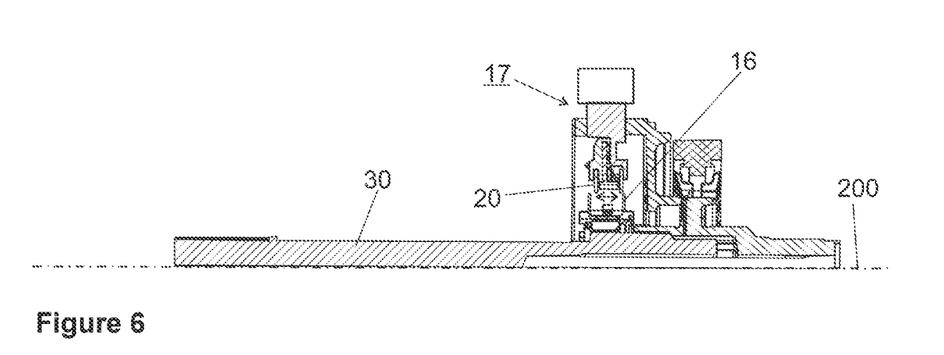
FIGS. 6 and 7 are longitudinal sectional views of a torque sensor illustrating alignment of a magnetic sensor in a longitudinal direction.
Figure 7:
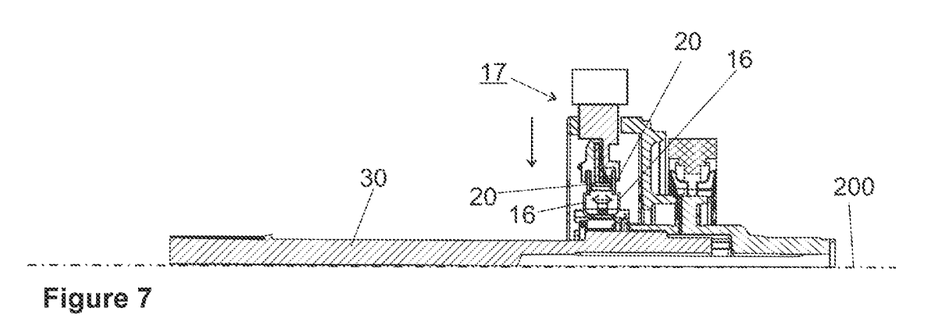
Figure 8:
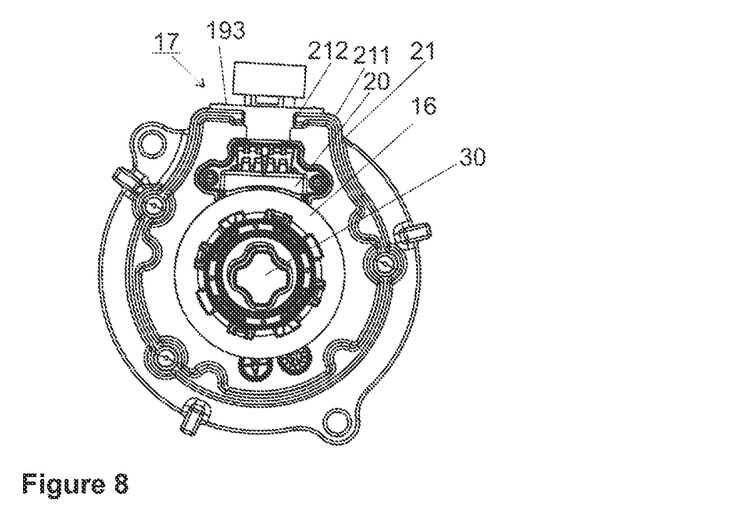
FIG. 8 is a front view of a torque sensor with an aligned magnetic sensor.
Figure 9:
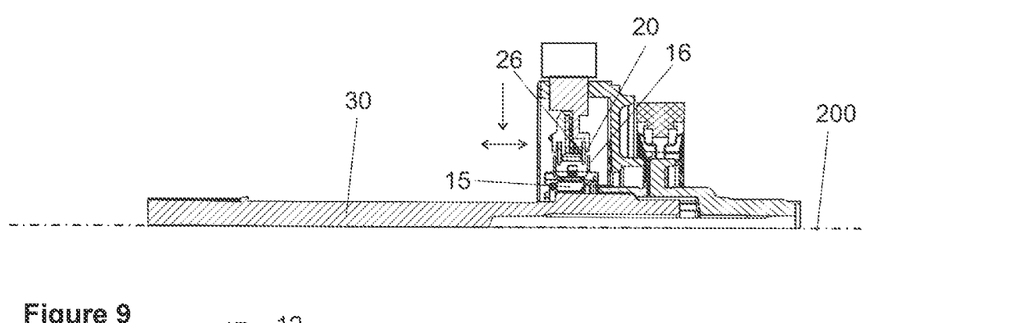
FIG. 9 is a longitudinal sectional view of a torque sensor in a final assembly step.

In a further assembly step, as illustrated in a longitudinal section in FIGS. 6 and 7, the sensor unit 17 is displaced along the longitudinal axis 200, specifically in such a way that the sensor unit 17 is arranged centrally relative to the magnetic flux conductor 16 connected to the lower steering shaft 31. For this purpose, the sensor unit 17 is firstly moved into the two end positions illustrated in FIGS. 6 and 7, in which in each case one of the outer sides of the magnetic flux conductor 20 of the sensor unit is brought into contact with the inside of the magnetic flux conductor 16 connected to the lower steering shaft 31, and after that a central position that is determined by using the limiting positions is assumed. The sensor unit 17 is then pressed into the housing opening 212 until the underside of the crosspiece 193 comes into contact with the outer side of the edge 211 of the second housing 21 of the torque sensor. This assembly state is shown in FIGS. 8 and 9. The magnetic flux conductors 16, 20 are aligned relative to each other such that the magnetic field sensor 26 is arranged centrally relative to the ring magnet 15. The magnetic flux conductors 16, 20 overlap considerably in the radial direction when pressed in, so that the sensor unit 17 can detect the movement of the ring magnet 15 with respect to the magnetic flux conductor 16.

Figure 10:
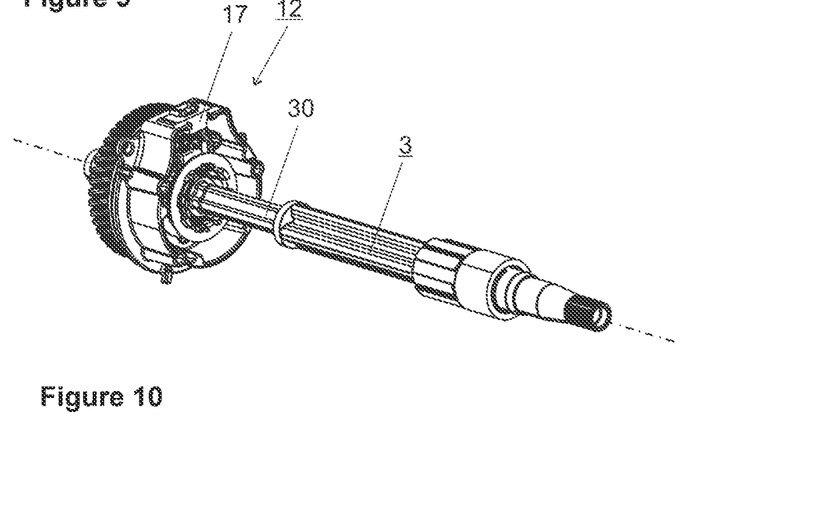
FIG. 10 is a perspective view of a torque sensor arranged on a steering shaft.
Figure 11:
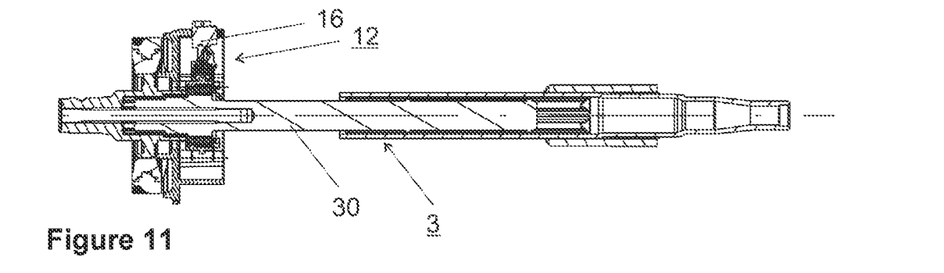
FIG. 11 is a longitudinal sectional view through the arrangement in FIG. 10.

FIG. 10 illustrates the torque sensor unit 12 with mounted sensor unit 17 arranged on the steering shaft 3. FIG. 11 shows a corresponding longitudinal section through the assembly.

The above-described assembly of the torque sensor unit 12 by means of a robot 27 is illustrated in FIGS. 12 to 16.

Figure 12:
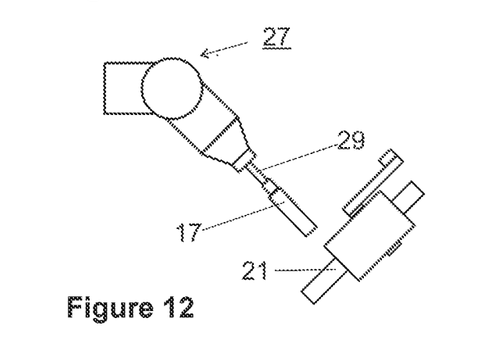
FIG. 12 is a schematic view of a first step of assembling a torque sensor by means of a robot.
Figure 13:
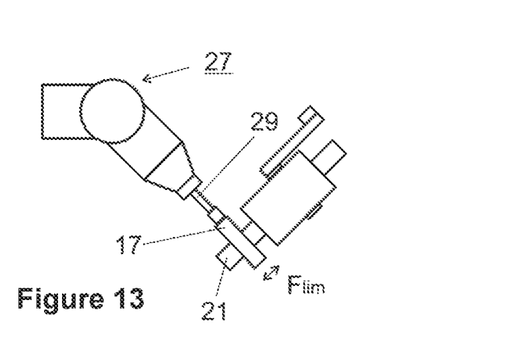
FIG. 13 is a schematic view of a second step of assembling a torque sensor by means of a robot.
Figure 14:
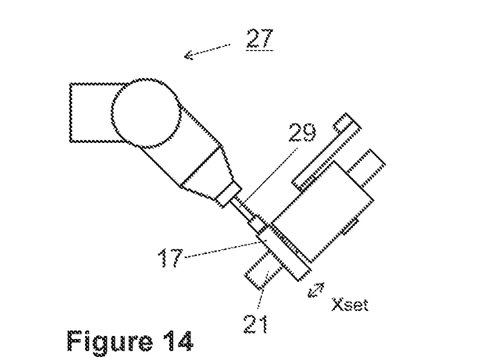
FIG. 14 is a schematic view of a third step of assembling a torque sensor by means of a robot.

The robot 27 has a multi-axis manipulator which, for example, can be designed in the form of a multi-axis articulated-arm robot. The movement of the individual axes of the manipulator can be carried out by means of specific control of drives which are connected to the individual components of the manipulator. The robot is preferably sensitive and has at least one sensor device integrated, which is configured to measure forces and displacements. The multi-axis manipulator has a pressing axis 28. The robot 27 has a gripper arm 29 which can be rotated around a first pivot axis. As illustrated in FIG. 12, the gripper arm 29 grips the sensor unit 17 and positions the latter in the housing opening of the second housing 21 of the torque sensor unit with a maximum permissible force $F_{lim}$ (FIG. 13). The central position between the magnetic flux conductor (not illustrated) along the longitudinal axis is assumed by detecting the limiting positions and calculating a predefined distance $x_{set}$ (FIG. 14).

Figure 15:
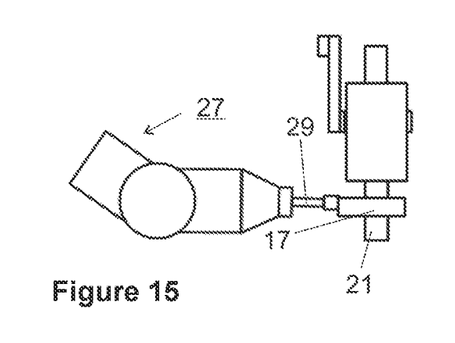
FIG. 15 is a schematic view of a fourth step of assembling a torque sensor by means of a robot.
Figure 16:
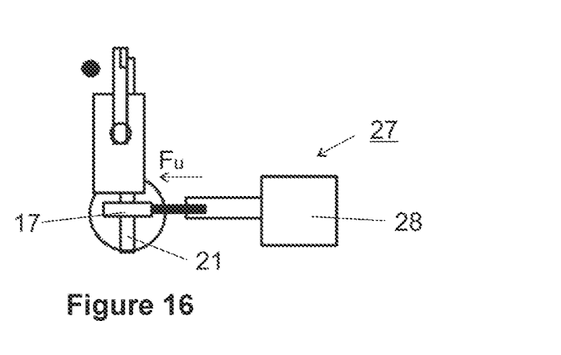
FIG. 16 is a schematic view of a fifth step of assembling a torque sensor by means of a robot.

FIGS. 15 and 16 illustrate how the pressing axis of the robot 28 grips the sensor unit 17 and presses the latter into the second housing 21 with a predefined force $F_u$.

The use of the robot permits the joining process to be completely automated, as a result of which it can be carried out particularly economically.

What is claimed is:

1. A torque sensor unit comprising:
   a ring magnet that is connectable to a first partial shaft for conjoint rotation;
   a magnetic flux conductor that is connectable to a second partial shaft;
   a sensor unit having a first housing, wherein the sensor unit detects a change in rotational angle between the first and second partial shafts; and
   a second housing that surrounds the ring magnet and the magnetic flux conductor, the second housing being fixedly connected to the first housing of the sensor unit, wherein the second housing has a housing opening in which the first housing of the sensor unit is fixed by way of a frictional, press-fit connection, wherein the housing opening has a first profile on at least two side faces, wherein the first housing of the sensor unit has a second profile arranged on outer faces corresponding to the at least two side faces of the housing opening, wherein the first and second profiles have grooves that are parallel.

2. The torque sensor unit of claim 1 wherein the first housing has a T-shaped region with a neck and a crosspiece arranged perpendicular thereto.

3. The torque sensor unit of claim 2 wherein the crosspiece is in contact with an outer side of the second housing when pressed in and delimits a pressing-in depth.

4. The torque sensor unit of claim 3 wherein the at least two side faces are opposite each other and extend parallel to a longitudinal axis of the first and second partial shafts.

5. The torque sensor unit of claim 3 wherein the first and second profiles are rotated by an angle of 90° to one another.

6. The torque sensor unit of claim 3 wherein a ductility of a first material into which the first profile is introduced is different than a ductility of a second material into which the second profile is introduced.

7. The torque sensor unit of claim 3 wherein in a widened region the neck widens towards the crosspiece, wherein the second profile is applied to the at least two side faces of the housing opening in the widened region.

8. The torque sensor unit of claim 3 wherein, once pressed-in, the first and second profiles inter-engage to form the frictional, press-fit connection.

9. The torque sensor unit of claim 1 wherein the sensor unit comprises a magnetic flux conductor and a magnetic sensor disposed on a printed circuit board.

10. A method for assembling a torque sensor unit for an electromechanical power steering system that includes a ring magnet connected to a first partial shaft for conjoint rotation, a magnetic flux conductor connected to a second partial shaft, with the first and second partial shafts being axially opposite one another and connected by a torsion bar, a sensor unit that has a first housing and detects a change in rotational angle between the first and second partial shafts, and a second housing that surrounds the ring magnet and the magnetic flux conductor, the method comprising:
  positioning the sensor unit in a housing opening of the second housing; and
  pressing the sensor unit into the housing opening to form a frictional connection,
  wherein the housing opening has a first profile on at least two side faces, wherein the first housing of the sensor unit has a second profile arranged on outer faces corresponding to the at least two side faces of the housing opening, wherein the first and second profiles have grooves that are parallel.

11. The method of claim 10 wherein the positioning comprises:
  introducing the sensor unit into the housing opening;
  lowering the sensor unit into the housing opening until the sensor unit lies against the housing opening and reaches into the magnetic flux conductor;
  moving the sensor unit in the housing opening between two limits formed by the magnetic flux conductor to determine a central position; and
  moving the sensor unit in the housing opening to the central position.

12. The method of claim 10 wherein the magnetic flux conductor is a first magnetic flux conductor, wherein the sensor unit comprises a second magnetic flux conductor and a magnetic sensor disposed on a printed circuit board.

13. The method of claim 10 wherein the at least two side faces are opposite each other and extend parallel to a longitudinal axis of the first and second partial shafts.

14. The method of claim 10 wherein the first and second profiles are rotated by 90° relative to one another.

15. The method of claim 10 wherein a ductility of a first material into which the first profile is introduced is different than a ductility of a second material into which the second profile is introduced.

16. The method of claim 10 wherein the first housing of the sensor unit has a T-shaped region with a neck and a crosspiece arranged perpendicular thereto.

17. The method of claim 16 wherein the crosspiece is in contact with an outer side of the second housing when pressed in and delimits a pressing-in depth.

18. The method of claim 16 wherein in a widened region the neck widens towards the crosspiece, wherein the second profile is applied to the at least two side faces of the housing opening in the widened region.

19. The method of claim 10 comprising attaching the torque sensor assembly to a steering shaft in a motor vehicle and fixing the torque sensor assembly to the first and second partial shafts of the steering shaft such that the torque sensor assembly detects a change in rotational angle between the two axially opposite partial shafts.

20. A torque sensor unit comprising:
  a ring magnet that is connectable to a first partial shaft for conjoint rotation;
  a magnetic flux conductor that is connectable to a second partial shaft;
  a sensor unit having a first housing, wherein the sensor unit detects a change in rotational angle between the first and second partial shafts; and
  a second housing that surrounds the ring magnet and the magnetic flux conductor, the second housing being fixedly connected to the first housing of the sensor unit, wherein the second housing has a housing opening in which the first housing of the sensor unit is fixed by way of a frictional, press-fit connection, wherein the housing opening has a first profile on at least two side faces, wherein the first housing of the sensor unit has a second profile arranged on outer faces corresponding to the at least two side faces of the housing opening, wherein, once pressed-in, the first and second profiles inter-engage to form the frictional, press-fit connection.

* * * * *